(No Model.)

W. O. SILVEY & L. SHIFLET.
SPONGE OR BREAD RAISING OVEN.

No. 497,609. Patented May 16, 1893.

WITNESSES:
J. A. Bergstrom
C. Sedgwick

INVENTOR
W. O. Silvey
L. Shiflet
BY Munn & Co
ATTORNEYS.

UNITED STATES PATENT OFFICE.

WILLIAM O. SILVEY AND LEMUEL SHIFLET, OF MIDDLEPORT, OHIO.

SPONGE OR BREAD RAISING OVEN.

SPECIFICATION forming part of Letters Patent No. 497,609, dated May 16, 1893.

Application filed February 3, 1893. Serial No. 460,860. (No model.)

*To all whom it may concern:*

Be it known that we, WILLIAM O. SILVEY and LEMUEL SHIFLET, both of Middleport, in the county of Meigs and State of Ohio, have invented a new and Improved Sponge or Bread Raising Oven, of which the following is a full, clear, and exact description.

Our invention is intended as an improvement on the portable oven for which Letters Patent of the United States No. 475,161 were issued May 17, 1892.

The object of this invention is to simplify the construction shown in the said patent and produce a portable oven which is especially adapted for sponge or bread raising, which is so simple and of such shape that it can be very cheaply made, which is adapted to receive an ordinary bread pan, and which is provided with simple means for maintaining an even temperature in the material in the pan.

To these ends our invention consists in certain features of construction and combinations of the same, as will be hereinafter described and claimed.

Reference is to be had to the accompanying drawings forming a part of this specification, in which similar figures of reference indicate corresponding parts in all the views.

Figures 1, 2:
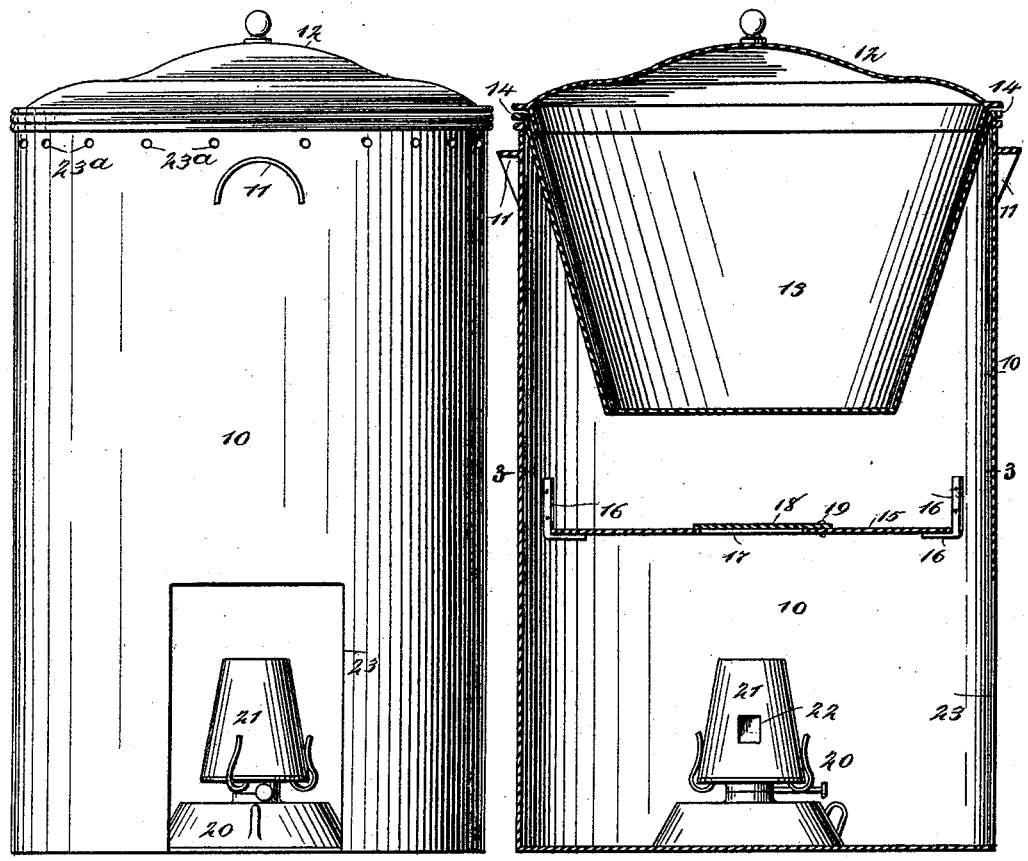
Figure 3:
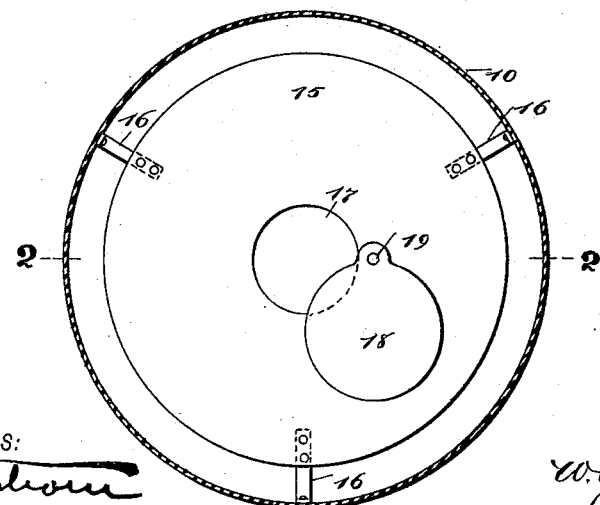

Figure 1 is a front elevation of the oven. Fig. 2 is a central vertical cross section of the same on the line 2—2 in Fig. 3; and Fig. 3 is a sectional plan on the line 3—3 in Fig. 2.

The oven is provided with an upright shell 10 which is preferably of a cylindrical form because it can be more cheaply made in this shape and because also that this shape of shell is better adapted to receive and support a bread pan. The shell 10 is closed at the bottom and at the top, and on opposite sides is provided with hand holds or ears 11 by which it may be lifted. It is also provided with a removable cover 12 and is adapted to receive and support the bread pan 13 which is of the usual construction, having tapering sides and having also a top flange 14 adapted to rest on the top of the shell 10. When the bread pan is in position in the shell it may be covered by the cover 12 which fits the pan as well as the shell. Near the center of the shell is a transverse plate or partition 15 which is arranged in a horizontal position and which is supported upon brackets 16 secured to the shell, the partition or plate being of smaller diameter than the shell, so that an air space or flue is formed between the edge of the plate or partition and the shell. In the center of the partition is an opening 17 which may be closed by a horizontally swinging lid 18, this being pivoted, as shown at 19, on the plate 15 at one side of the opening 17.

The oven is heated by a lamp 20 in which oil or gasoline may be burned, and this has a tin chimney 21 with a mica panel 22 through which the flame of the lamp may be seen. Opposite the lamp and in the front side of the shell, near the bottom, is an opening 23 which is always open and through which the air enters the oven, and around the upper portion of the shell are perforations $23^a$, see Fig. 1, through which the heated air and the gases of combustion escape.

When the oven is used, the sponge or bread to be raised is placed in the bread pan 13, the lamp 20 lighted, and the bread pan placed in the top of the shell 10 as described. Under ordinary circumstances, the heat from the lamp rises and, deflected by the plate or partition 15, it passes up around the edge of the plate and out through the perforations $23^a$, the rising heat serving to keep the material in the bread pan at the right temperature. The desired temperature may be, of course, regulated in a measure by adjusting the lamp-wick, but if a relatively high temperature in the pan is desired, the lid 18 is opened so that the heat rises direct from the lamp chimney, passes through the hole 17, and strikes on the bottom of the bread pan. The opening 23 provides sufficient air to promote combustion, and this opening, in connection with the perforations $23^a$, makes a good draft.

Having thus described our invention, we claim as new and desire to secure by Letters Patent—

An oven of the class described, comprising a shell having an opening at the bottom, perforations near the top and a removable cover, the shell being adapted to support a bread
5 pan in its top, a heating lamp held in the bottom of the shell, and a horizontal partition arranged above the shell, the partition having an air space around its edge and a lid covered opening near its center, substantially as described.

WILLIAM O. SILVEY.
LEMUEL SHIFLET.

Witnesses:
W. E. STANSBURY,
J. C. MCMASTER.